(12) United States Patent
Hou

(10) Patent No.: US 10,437,253 B2
(45) Date of Patent: Oct. 8, 2019

(54) CONTROL METHOD AND SYSTEM, AND MOBILE ROBOT USING THE SAME

(71) Applicant: ANKOBOT (SHANGHAI) SMART TECHNOLOGIES CO., LTD., Shanghai (CN)

(72) Inventor: Xiru Hou, Shanghai (CN)

(73) Assignee: ANKOBOT (SHANGHAI) SMART TECHNOLOGIES CO., LTD., Shanghai (CN)

( * ) Notice: Subject to any disclaimer, the term of this patent is extended or adjusted under 35 U.S.C. 154(b) by 0 days.

(21) Appl. No.: 16/115,898

(22) Filed: Aug. 29, 2018

(65) Prior Publication Data

US 2019/0212750 A1 Jul. 11, 2019

Related U.S. Application Data

(63) Continuation of application No. 16/106,471, filed on Aug. 21, 2018, which is a continuation of application No. PCT/CN2018/090657, filed on Jun. 11, 2018.

(30) Foreign Application Priority Data

Dec. 15, 2017 (CN) .......................... 2017 1 1347545

(51) Int. Cl.
*G05D 1/02* (2006.01)
*G06T 7/73* (2017.01)
*G05D 1/00* (2006.01)

(52) U.S. Cl.
CPC ......... *G05D 1/0246* (2013.01); *G05D 1/0088* (2013.01); *G05D 1/0214* (2013.01);
(Continued)

(58) Field of Classification Search
CPC .. G05D 1/0246; G05D 1/0088; G05D 1/0214; G05D 2201/0203; G06T 7/74; G06T 2207/30244
(Continued)

(56) References Cited

U.S. PATENT DOCUMENTS 5,961,571 A * 10/1999 Gorr ....................... G01S 3/783
340/988
6,654,482 B1 * 11/2003 Parent .................. G05D 1/0234
382/104
(Continued)

FOREIGN PATENT DOCUMENTS

CN 1611064 4/2005
CN 107329476 11/2017

OTHER PUBLICATIONS

International Patent Application No. PCT/CN2018/090657, International Search Report and Written Opinion with English translation of Opinion, dated Sep. 5, 2018, 13 pages.

*Primary Examiner* — Jaime Figueroa
(74) *Attorney, Agent, or Firm* — Leber IP Law; David C. Robertson

(57) ABSTRACT

The present application provides a control method, and system, and a mobile robot using the same. The control method comprises the following steps: under a navigation operating environment of the mobile robot, controlling the image acquisition device to capture images in real time; analyzing at least one captured image; and controlling the movement of the mobile robot after analyzed that the image acquisition device faces an overexposure region. In the present application, the problem that the robot cannot determine the navigation and pose thereof based on the acquired images due to lighting problems is solved.

9 Claims, 6 Drawing Sheets

(52) U.S. Cl.
CPC ....... *G06T 7/74* (2017.01); *G05D 2201/0203* (2013.01); *G06T 2207/30244* (2013.01)

(58) Field of Classification Search
USPC ......................................................... 700/245
See application file for complete search history.

(56) References Cited

U.S. PATENT DOCUMENTS

| | | | |
|---|---|---|---|
| 7,133,069 B2* | 11/2006 | Wallach | H04N 5/235 348/218.1 |
| 2002/0006282 A1* | 1/2002 | Ushiro | H04N 13/254 396/429 |
| 2002/0176010 A1* | 11/2002 | Wallach | H04N 5/235 348/229.1 |
| 2003/0053691 A1* | 3/2003 | Chamberlain | G06K 9/38 382/170 |
| 2008/0249663 A1* | 10/2008 | Aoyama | G06K 7/14 700/259 |
| 2009/0140659 A1* | 6/2009 | Kurt | H05B 33/0818 315/158 |
| 2009/0290033 A1* | 11/2009 | Jones | G08B 13/19693 348/218.1 |
| 2010/0110280 A1* | 5/2010 | Aoyama | G01S 7/023 348/364 |
| 2014/0085410 A1* | 3/2014 | Jones | G08B 13/19693 348/36 |
| 2015/0138339 A1* | 5/2015 | Einecke | H04N 5/23229 348/118 |
| 2016/0014426 A1* | 1/2016 | Richert | H04N 19/51 375/240.16 |
| 2016/0086050 A1* | 3/2016 | Piekniewski | G06K 9/4671 382/103 |
| 2016/0195877 A1* | 7/2016 | Franzius | A01D 34/008 348/47 |
| 2016/0288330 A1* | 10/2016 | Konolige | H04N 13/239 |
| 2016/0375592 A1* | 12/2016 | Szatmary | B25J 5/00 700/255 |
| 2017/0109856 A1* | 4/2017 | Inazumi | B25J 9/1697 |
| 2018/0125003 A1* | 5/2018 | Wu | A01D 34/00 |
| 2018/0288303 A1* | 10/2018 | Wang | B64C 39/024 |
| 2019/0102656 A1* | 4/2019 | Kwant | G06K 9/6259 |

* cited by examiner

CONTROL METHOD AND SYSTEM, AND MOBILE ROBOT USING THE SAME

RELATED APPLICATION

This application is a continuation application of U.S. patent application Ser. No. 16/106,471, filed Aug. 21, 2018, which is a continuation of International Patent Application No. PCT/CN2018/090657, filed Jun. 11, 2018, which claims priority to Chinese Patent Application No. 201711347545.X, filed Dec. 15, 2017, the entire contents of which are hereby incorporated by reference.

TECHNICAL FIELD

The present application relates to the field of intelligent robots, particularly to a control method, and system, and a mobile robot using the same.

BACKGROUND

A mobile robot is a machine which can work automatically. The mobile robot can be operated under the command of human operators or in pre-programmed programs, and can act according to principles set out by the artificial intelligence technology as well. This type of mobile robot can be used indoors or outdoors, and can be used in industry or household. For example, the mobile robot can be used to replace security guards to perform patrol, or replace people to clean the surface. The mobile robot can also be used to accompany family members or assist in doing office work. With the development of motion control technology of mobile robots, VSLAM (Visual Simultaneous Localization and Mapping) technology provides more accurate navigation capabilities for the mobile robots, so that the autonomous movement of mobile robots can be more effective. However, in practical applications, the mobile robot cannot obtain sufficient features used for localization from visual information because of lighting problems such as overly bright light when the mobile robot acquires visual information via a visual sensor, such that the mobile robot cannot determine the navigation and pose thereof based on the acquired visual information.

SUMMARY

In view of the above defects in the prior art, the objective of the present application is to provide a control method and system, and a mobile robot using the same, so as to solve the problem in the prior art that a robot cannot determine navigation and pose thereof based on the acquired visual information due to lighting problems.

In one aspect, the present application provides a system for controlling a mobile robot. The mobile robot comprises an image acquisition device, and the system comprises: a storage device, configured to store one or more programs; and a processing device, connected with the storage device and configured to perform the following steps through invoking the one or more programs: under a navigation operating environment of the mobile robot, controlling the image acquisition device to capture images in real time; analyzing at least one captured image; and controlling the movement of the mobile robot after analyzed that the image acquisition device faces an overexposure region.

In some embodiments, the step of analyzing at least one captured image comprises: determining the current position of the mobile robot based on the features identified from the at least one image.

In some embodiments, the step of analyzing at least one captured image comprises: determining that the image acquisition device faces an overexposure region based on grayscale features in the at least one image.

In some embodiments, the step of controlling the movement of the mobile robot after analyzed that the image acquisition device faces an overexposure region comprises: adjusting a framing surface of the image acquisition device, and navigating the mobile robot according to the images captured by the adjusted image acquisition device.

In some embodiments, the step of adjusting a framing surface of the image acquisition device and navigating the mobile robot according to the images captured by the adjusted image acquisition device comprises any of the following steps: controlling the image acquisition device to deflect by an angle, and controlling the movement of the mobile robot according to the adjusted deflection angle and the original navigation route; controlling the image acquisition device to deflect by an angle, and modifying the original navigation route according to the adjusted deflection angle to control the movement of the mobile robot.

In some embodiments, the step of controlling the movement of the mobile robot after analyzed that the image acquisition device faces an overexposure region comprises: shielding the image provided by the image acquisition device, and controlling the movement of the mobile robot according to the original navigation route.

In some embodiments, the step of controlling the movement of the mobile robot after analyzed that the image acquisition device faces an overexposure region comprises: adjusting the amount of incoming light in the image acquisition device and navigating the mobile robot according to the images captured by the adjusted image acquisition device.

In some embodiments, the image acquisition device comprises an adjustable aperture and/or a mask; and the amount of incoming light can be reduced by the processing device through adjusting the aperture and/or adjusting the position of the mask.

In some embodiments, the step of controlling the movement of the mobile robot after analyzed that the image acquisition device faces an overexposure region comprises: controlling the movement of the mobile robot after analyzed that the time during which the image acquisition device faces an overexposure region is longer than a preset time.

In another aspect, the present application provides a mobile robot. The mobile robot comprises: an image acquisition device; the system for controlling a mobile robot as mentioned above, configured to determine that the image acquisition device faces an overexposure region based on at least one image captured by the image acquisition device and output movement instructions based on the control of the movement of the mobile robot; and a movement system, connected with the control system and configured to drive the mobile robot to move based on the movement instructions.

In some embodiments, the movement system comprises: at least two sets of rolling wheels, wherein at least one set of rolling wheels is a set of controlled rolling wheels; and a drive control device, connected with the system for controlling a mobile robot and configured to drive the set of controlled rolling wheels to roll based on the movement instructions.

In some embodiments, the image acquisition device is arranged on the top surface of the mobile robot, and the angle between the optic axis of the field of view of the image acquisition device and the vertical line is ±30°.

In some embodiments, the mobile robot further comprises a cleaning system. The cleaning system is connected with the system for controlling a mobile robot and configured to clean the surface along the route along which the movement system moves.

In some embodiments, the system for controlling a mobile robot is further configured to output movement instructions containing pose control information based on cleaning control of the cleaning robot on the current navigation route; and the movement system is used to adjust the movement pose of the cleaning robot based on the movement instructions.

In yet another aspect, the present application provides a method for controlling a mobile robot, wherein the mobile robot comprises an image acquisition device, and the method comprises the following steps: under a navigation operating environment of the mobile robot, controlling the image acquisition device to capture images in real time; analyzing at least one captured image; and controlling the movement of the mobile robot after analyzed that the image acquisition device faces an overexposure region.

As mentioned above, the control method and system, and the mobile robot using the same in the present application have the following beneficial effects: through the technical solution that analyzing the captured images and redetermining the navigation and pose of the robot after analyzed that the image acquisition device faces an overexposure region, the navigation of the mobile robot can be controlled when the image acquisition device faces the overexposure region, thereby solving the problem that the robot cannot determine the navigation and pose thereof based on the acquired images due to lighting problems.

DETAILED DESCRIPTION

Figure 1:
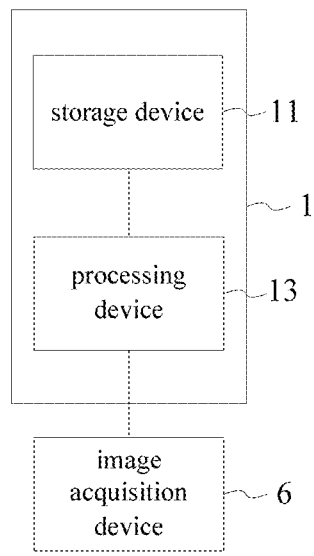
FIG. 1 shows a structural schematic diagram of a control system of a mobile robot of the present application in one embodiment.

Implementations of the present application will be described below through specific embodiments, and those skilled in the art can easily understand other advantages and effects of the present application from the contents disclosed in the present specification.

In the following description, several embodiments of this application are described combined with the drawings. However, it should be understood that other embodiments may be available, and any changes in mechanical composition, structure, electrical and operation may be made without departing from the spirit and scope of the application. The following detailed description is not to be considered as limited, and the scope of the embodiments of the present invention is defined by the appended claims. The terminology used herein is only for describing particular embodiments, spatial-related terms such as "up", "down", "left", "right", "below", "top", "above", "bottom", etc., may be used in the text for illustrating the relationship of one element or feature to another element or feature.

Moreover, as used herein, such single forms as "one", "a" and "the" aim at also including the plural forms, unless contrarily indicted in the text. It should be further understood that, such terms as "comprise" and "include" indicate the existence of the features, steps, operations, elements, components, items, types and/or groups, but do not exclude the existence, emergence or addition of one or more other features, steps, operations, elements, components, items, types and/or groups. The terms "or" and "and/or" used herein are explained to be inclusive, or indicate any one or any combination. Therefore, "A, B or C" or "A, B and/or C" indicates "any of the following: A; B; C; A and B; A and C; B and C; A, B and C". Exceptions of the definition only exist when the combinations of elements, functions, steps or operations are mutually exclusive inherently in some ways.

The mobile robot is a robot working under complex environments and possessing capabilities such as self-organization, autonomous operation and autonomous planning. In terms of functions and applications, the mobile robot can be divided into medical robots, military robots, robots serving the disabled, patrol robots and cleaning robots, etc. Based on the visual information provided by visual sensor and mobile data provided by other motion sensors, a mobile robot can create map data of the site where the robot is located, and can also provide route planning, route planning adjustment and navigation service based on the created map data, so that the efficiency of the mobile robot becomes higher. Wherein, the visual sensor for example includes an image acquisition device, and the corresponding visual information is image data (image for short below). The motion sensor for example includes speed sensor, odometer sensor, ranging sensor and cliff sensor. However, since the visual sensor cannot acquire sufficient features used for localization because of lighting problems such as overly bright light when the visual sensor acquires visual information, such that the mobile robot cannot determine the navigation and pose thereof based on the acquired visual information.

In order to solve the above problem, the present application provides a system for controlling a mobile robot, namely, a control system of a mobile robot. Please refer to FIG. 1 which shows a structural schematic diagram of a control system of a mobile robot of the present application in one embodiment, wherein the mobile robot includes an image acquisition device 6. The image acquisition device 6 includes but is not limited to a camera, a video camera, an image acquisition module integrated with an optical system or a CCD chip, and an image acquisition module integrated with an optical system and a CMOS chip. A power supply system of the image acquisition device 6 can be controlled by a power supply system of the mobile robot. During movement of the robot when being powered on, the image acquisition device starts to capture images. In addition, the image acquisition device can be arranged on the main body of the mobile robot. For example, with a cleaning robot as an example, the image acquisition device 6 can be arranged in the middle or at the edge of the top cover of the cleaning robot, or the image acquisition device 6 can be arranged below the plane of the top surface of the cleaning robot, and in a concave structure near the geometric center of the main body or near the edge of the main body. In some embodiments, the image acquisition device 6 can be arranged on the top surface of the mobile robot, and the angle between the optic axis of the field of view of the image acquisition device and the vertical line is ±30°. For example, the image acquisition device is located in the middle or at the edge of the top surface of the cleaning robot, and the angle between the optic axis of the image acquisition device and the vertical line is −30°, −29°, −28°, −27° . . . −1°, 0°, 1°, 2° . . . 29° or 30°. It should be noted that, those skilled in the art should understand that the angle between the optic axis and the vertical line or the horizontal line is only an example but not to limit the accuracy of the angle thereof within the range of 1°. The accuracy of the angle can be higher according to the actual design requirements of the robot, for example, more than 0.1°, 0.01° or the like. Endless examples will not be recited herein.

As shown in FIG. 1, the control system 1 includes a storage device 11 and a processing device 13.

The storage device 11 is configured to store one or more programs. The programs include corresponding programs invoked by the processing device 13 to perform steps such as controlling, analyzing and determining which will be described below. The storage device includes but is not limited to a high speed random access memory and a non-volatile memory, for example, one or more disk storage devices, flash storage devices or other non-volatile solid state storage devices. In some embodiments, the storage device can also include a storage away from one or more processors, for example, a network attached storage accessed via an RF circuit or an external port and a communication network (not shown). Wherein the communication network can be an Internet, one or more intranets, a local area network (LAN), a wireless local area network (WLAN), a storage area network (SAN) or an appropriate combination thereof. A storage controller can control the access of other assemblies of robot such as a central processing unit (CPU) and a peripheral interface to the storage device.

The processing device 13 is connected with a storage device 11 and can be in data communication with the image acquisition device 6. The processing device 13 can include one or more processors. The processing device 13 can be operably coupled to a volatile memory and/or a non-volatile memory in the storage device 11. The processing device 13 can execute instructions stored in the storage and/or non-volatile memory to perform operations in the robot, for example, analyzing the captured images and determining the navigation and pose of the robot based on the analyzed results. Thus, the processor can include one or more general-purpose microprocessors, one or more application specific integrated circuits (ASIC), one or more digital signal processors (DSP), one or more field programmable gate arrays (FPGA) or any combination thereof. The processing device is also operably coupled to an I/O port and an input structure, wherein the robot can interact with various other electronic apparatus by the I/O port, and the user can interact with a computing apparatus by the input structure. Therefore, the input structure can include a button, a keyboard, a mouse, a touchpad and the like. The other electronic apparatus can be a mobile motor in the movement device of the robot, or a slave processor dedicated to the control of the movement device in the robot, for example, a microcontroller unit (MCU).

In an example, the processing device is connected with the storage device and the image acquisition device respectively through data cables. The processing device interacts with the storage device through a data read-write technology, and the processing device interacts with the image acquisition device through an interface protocol. Wherein the data read-write technology includes but is not limited to a high-speed/low-speed data interface protocol, a database read-write operation and the like. The interface protocol includes but is not limited to an HDMI interface protocol, a serial interface protocol and the like.

The processing device 13 performs the following steps through invoking the programs stored in the storage device 11: under a navigation operating environment of the mobile robot, controlling the image acquisition device to capture images in real time; analyzing at least one captured image; and controlling the movement of the mobile robot after analyzed that the image acquisition device faces an overexposure region. Wherein, the navigation operating environment indicates the environment in which the robot moves according to the current localization and the navigation route determined based on the current localization and performs corresponding operations. For example, with a patrol robot as an example, the navigation operating environment indicates the environment in which a patrol robot moves according to a navigation route and performs security operations; and with a cleaning robot as an example, the navigation operating environment indicates the environment in which a cleaning robot moves according to a navigation route and performs cleaning operations.

Firstly, the processing device 13 controls the image acquisition device 6 to capture images in real time under a navigation operating environment of the mobile robot. For example, the image acquisition device can be a camera used for capturing static image or video. In one embodiment, the mobile robot can preset the time interval for capturing image according to the navigation operating environment, and then the processing device controls the image acquisition device to capture image at the preset time interval to acquire static images at different time. In another embodiment, the processing device controls the image acquisition device to capture video.

And then, the processing device 13 analyzes at least one captured image. Wherein, when the images acquired by the image acquisition device are static images, the processing device can analyze at least one image in the acquired static images. When the image acquisition device acquires video, since the video is composed of image frames, the processing device can firstly continuously or discontinuously collect image frames in the acquired video, and then select one frame of image to serve as an image for analysis. The processing device determines the region which the image acquisition device of the mobile robot faces by performing an analysis on one or more images.

Next, when the image acquisition device 6 is determined to face an overexposure region after analysis, the processing device 13 controls the movement of the mobile robot. In the present application, the overexposure region is a geographic region, for example, a highlight region formed when sunlight irradiates onto the surface or a highlight region formed when a spot light projects onto the surface. The overexposure region indicates that the amount of incoming light of the image acquisition device of the mobile robot is excessive when the image acquisition device 12 faces a region with a strong light or faces a light source, which leads to the brightness contained in the captured images is higher than a preset brightness threshold, namely, leads to there is overexposure point in the images, such that the processing device cannot extract sufficient features used for localization based on the acquired images, wherein the brightness contained in the captured image can be described via image grayscale values. For example, when the processing device detects that the grayscale value of a region contained in the image is greater than a preset grayscale threshold, the image can be determined to be an overexposure image, then the image acquisition device 12 of the mobile robot can be determined to face the overexposure region. In some embodiments, the brightness can be described via light intensity values provided by an illumination sensor in the image acquisition device, for example, the processing device acquires images and corresponding light intensity data, the processing device determines that the mobile robot faces an overexposure region when the light intensity data is greater than a preset light intensity threshold. Or, in some embodiments, the processing device determines whether the mobile robot faces an overexposure region based on both the grayscale values and light intensity data in the image. For example, the processing device determines that the mobile robot faces an overexposure region in a way of simultaneously satisfying two conditions in the above two examples.

When the image acquisition device is determined to face an overexposure region, the movement of the mobile robot is controlled. The control system can control the movement of the mobile robot through redetermining the navigation and/or pose of the mobile robot. Herein, determining the navigation of the mobile robot includes determining the navigation route of the mobile robot. Determining the pose of the mobile robot includes determining the position and orientation of the mobile robot, wherein the orientation of the mobile robot can be for example the deflection angle between the movement direction of the mobile robot and the image acquisition device of the mobile robot. When the image acquisition device faces an overexposure region, because the light is too strong, the processing device cannot identify sufficient features used for localization from the images and cannot determine the subsequent navigation and pose of the mobile robot. Therefore, the processing device needs to adjust the navigation and pose of the mobile robot according to actual conditions, such that the image acquisition device can control the mobile robot when facing an overexposure region.

As to the control system of the mobile robot in the present application, through the technical solution in which a processing device is used to analyze the images captured by an image acquisition device and redetermine the navigation and pose of the robot when the image acquisition device is determined to face an overexposure region, the navigation of the mobile robot can be controlled when the image acquisition device faces the overexposure region, thereby solving the problem that the robot cannot determine the navigation and pose thereof based on the acquired images due to lighting problems.

In order to localize the current position of the mobile robot accurately, the step that the processing device analyzes at least one captured image includes: determining the current position of the mobile robot based on the features identified in at least one image, wherein the features include but are not limited to shape features and grayscale features. The shape features include but are not limited to corner features, line features, edge features and curve features. The grayscale features include but are not limited to grayscale jump features, grayscale values greater than or less than a grayscale threshold, region dimensions of a preset grayscale range contained in the image frames. In addition, in order that the mobile robot can acquire sufficient features used for localization based on the images, and determine the navigation and pose thereof, the number of features identified in the images is multiple, for example, more than 10.

In one embodiment, the processing device can determine the current position of the mobile robot based on the features identified in one image. For example, the localization information of the robot in the current physical space is acquired through identifying the pattern of an object in the captured image and matching that pattern with the pattern of a standard component and determining the localization information based on standard physical features of the standard component. For another example, the localization information of the robot in the current physical space is determined through matching the features identified in the image with the features in landmark information in the preset map data. In another embodiment, the processing device can determine the current position of the mobile robot based on the features identified in at least two images. For example, the position and pose of the robot can be determined based on the position offset information of the matching features in two image frames.

In addition, when the processing device performs localization analysis based on at least one captured image, not necessarily limited by a time sequence, the processing device can determine whether the image acquisition device faces the overexposure region based on the grayscale features in at least one image. In practical applications, when the image acquisition device faces the overexposure region, the processing device may not obtain sufficient features used for localization from the captured images, or the obtained features used for localization are not accurate. With cleaning robot as an example, if the cleaning robot cannot be localized accurately under the influence that the image acquisition device faces the overexposure region, the following problems can occur due to localization errors: the cleaning robot cannot move nearby a window in a room, so that the corresponding surface is not cleaned; or the cleaning robot may collide with the wall when moving to the wall by the window, so that the cleaning robot cannot adjust the pose timely to clean the surface (for example, adjust the pose such that the side brush is on the side of the wall).

Therefore, the processing device can analyze whether the image acquisition device faces the overexposure region. Herein, the images captured by the image acquisition device are usually of an RGB color mode, thus, the processing device should perform grayscale processing on the captured images to obtain grayscale images, and then the grayscale images are subjected to overexposure analysis to determine whether the image acquisition device faces the overexposure region. Wherein, the processing device can perform grayscale processing on the captured images to obtain grayscale images through component method, a maximum value method, a mean value method or a weighted mean method and so on. Grayscale image is monochrome image with 256 gray levels or scales from black to white, wherein 255 represents white and 0 represents black.

In one embodiment, the processing device determines whether the image acquisition device faces an overexposure region through an analysis, in the grayscale image, on the grayscale distribution, gray average, maximum and minimum grayscale values, and the area proportion of a region with larger grayscale to the whole image region.

In one example, in the case that the grayscale feature is represented by grayscale distribution, when the processing device analyzes the grayscale distribution in the grayscale images and determines that the grayscale distribution is centered in a preset grayscale overexposure interval, the processing device determines that the image acquisition device faces the overexposure region. For example, the grayscale overexposure interval can be obtained according to technical experiences or experimental designs and is stored in the mobile robot in advance.

In another example, in order to prevent excessive control of the pose and navigation of the mobile robot, when determining that the image includes grayscale values falling within the grayscale overexposure interval, the processing device further analyzes whether the area proportion of a pixel region corresponding to the grayscale values falling within the overexposure region to the whole image is greater than a preset proportion threshold, if so, the processing device cannot extract sufficient features, if not, the processing device determines that the image acquisition device does not face the overexposure region, wherein the grayscale overexposure interval and preset proportion threshold can be obtained according to technical experiences or experimental designs and are stored in the mobile robot in advance. In addition, the range of the area proportion can be determined according to the actual conditions of the navigation operating environment, as long as the condition that the processing device cannot extract sufficient features is satisfied.

Figure 2:
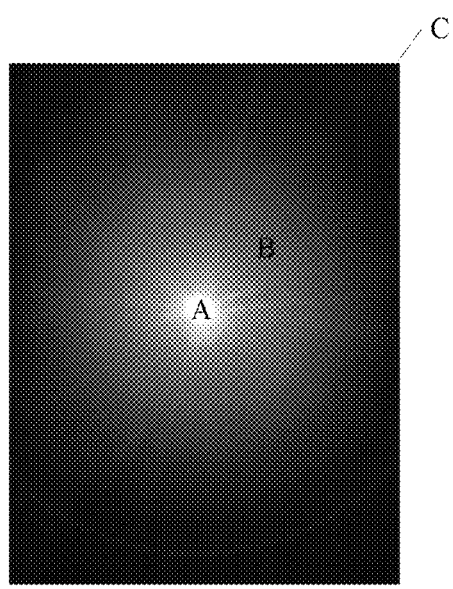
FIG. 2 shows a schematic diagram of the grayscale of an image captured when the image acquisition device in a control system of a mobile robot of the present application faces an overexposure region.

However, in the case that the situation does not belong to a common situation which can cause the above overexposure under the influence of light such as the image captured by the image acquisition device is a white wall, when the processing device determines whether the image acquisition device faces an overexposure region only based on the grayscale distribution or the area proportion of a region with larger grayscale to the whole image region, there is misjudgment. In order to reduce the above misjudgment, in another embodiment, please refer to FIG. 2 which shows a schematic diagram of the grayscale of an image captured when the image acquisition device in a control system of a mobile robot of the present application faces an overexposure region. When the image acquisition device faces an overexposure region, there is a situation that the grayscale image of the image captured by the image acquisition device is extremely bright in the middle and extremely dark at the edge, and the number of features is not sufficient for localization. In FIG. 2, regions denoted as A, B and C represent grayscales respectively, wherein A is an extremely bright region and in the middle, with the grayscale being close to 255, C is an extremely dark region and at the edge, with the grayscale being close to 0, the region B between region A and region C is a region with a higher grayscale, and sufficient features used for localization cannot be extracted from the above A, B, and C regions. Therefore, when the grayscale image of the image captured by the image acquisition device is extremely bright in the middle and extremely dark at the edge and has no feature information, the processing device determines that the image acquisition device faces an overexposure region.

It should be noted that, determining whether the image acquisition device faces an overexposure region based on the above one or more analyzing methods is only an example but not to limit the methods for determining whether the image acquisition device faces an overexposure region in the present application. In fact, those skilled in the art can determine whether the image acquisition device faces an overexposure region through evaluating whether the image acquisition device faces an overexposure region based on the results obtained by multiple grayscale analysis methods. These methods will not be described one by one herein. However, the method for determining that the image acquisition device faces an overexposure region based on the analysis on any of image grayscale values mentioned in the present application or based on the improvement on the image grayscale values should be deemed as a specific example of the present application.

After analysis, when the processing device determines that the image acquisition device faces an overexposure region, the movement of the mobile robot is controlled, wherein the determining manner includes: adjusting the framing surface of the image acquisition device, and navigating the mobile robot according to the images captured by the adjusted image acquisition device.

Wherein a framing surface of the image acquisition device mainly indicates a plane or a sphere which is vertical to the optical axis of the image acquisition device and where the image focused in the image acquisition device by means of an optical system in the image acquisition device. When the processing device analyzed that the image acquisition device faces an overexposure region, the processing device cannot acquire sufficient and accurate features from the captured images, therefore, the framing surface of the image acquisition device needs to be adjusted, so as to avoid localization errors caused by the overexposure region.

In one embodiment, the step that the processing device adjusts the framing surface of the image acquisition device and navigates the mobile robot according to the images captured by the adjusted image acquisition device includes: controlling the image acquisition device to deflect by an angle, and controlling the movement of the mobile robot according to the adjusted deflection angle and the original navigation route.

In one example, the image acquisition device can be movably arranged on the robot, wherein the movable manner includes horizontal rotation, up and down movement, pitching rotation or any combination thereof. Wherein, horizontal rotation of the image acquisition device indicates a movement that the image acquisition device rotates 360 degrees around a vertical line which is vertical to the horizontal surface. Pitching rotation of the image acquisition device indicates a movement that the angle between the optical axis of the image acquisition device and the horizontal surface is changed. The up and down movement of the image acquisition device indicates a movement that the image acquisition device moves up and down in the direction of a vertical line which is vertical to the horizontal surface. Herein, the image acquisition device can be arranged on a robot via a steering mechanism (for example, a cardan shaft) to realize any deflection movement. The image acquisition device can be arranged on the robot via a telescoping mechanism (for example, a lead screw) to realize up and down movement. For example, the above movable image acquisition device can be arranged in the middle or at the edge of the top cover of the cleaning robot.

Figure 3A:
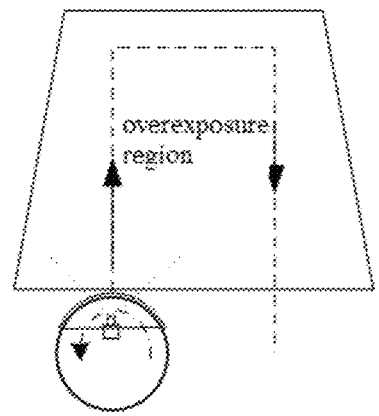
FIGS. 3a-3b show schematic diagrams of the movement of a mobile robot along the original navigation route after the image acquisition device deflects by an angle.
Figure 3B:
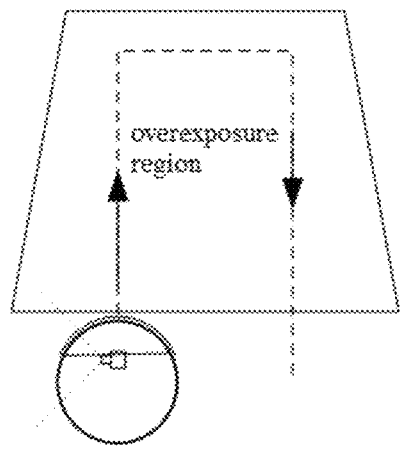

When the image acquisition device is movably arranged on the robot, the processing device controls the robot to deflect by an angle such that the robot avoids facing the overexposure region. And, after the image acquisition device deflects by an angle, the image acquisition device captures images again and analyzes at least one captured image. In this condition, if the processing device can extract sufficient features used for localization after analysis, the processing device determines the current position of the robot in the actual physical space, and the processing device controls the movement of the mobile robot according to the adjusted angle and the original navigation route. For example, please refer to FIG. 3a and FIG. 3b which are schematic diagrams of the movement of a mobile robot along the original navigation route after the image acquisition device deflects by an angle. As shown in FIG. 3a, when the robot senses that it is located in an overexposure region, a trapezoid in the figure represents an overexposure region, the processing device of the robot controls the image acquisition device of the robot to deflect by 90° as shown by a rotation arrow in the figure, such that the framing surface of the image acquisition device avoids facing the overexposure region, the processing device localizes the position of the robot under the current deflection pose in the actual physical space according to the features in the images acquired after deflection, and controls the movement system in the mobile robot to move along the original navigation route through modifying the deflection angle generated due to the deflection of the image acquisition device, namely, the state as shown in FIG. 3b. In addition, if the image acquisition device deflects by an angle, and the processing device still determines that the image acquisition device faces an overexposure region after analyzing the captured images, the above process of controlling the image acquisition device to deflect by an angle is repeated, until the processing device can extract sufficient features used for localization based on the analysis of the newly captured images, and then the processing device continues to control the robot.

Figure 4A:
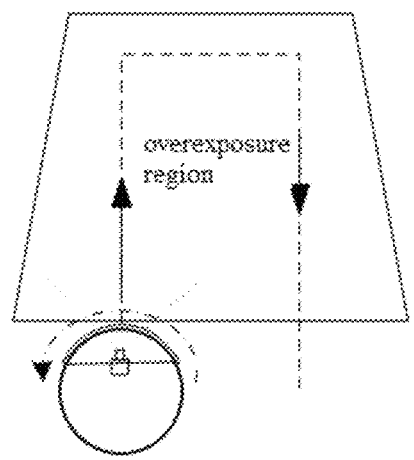
FIGS. 4a-4b show schematic diagrams of the movement of a mobile robot along the original navigation route after the mobile robot deflects by an angle.
Figure 4B:
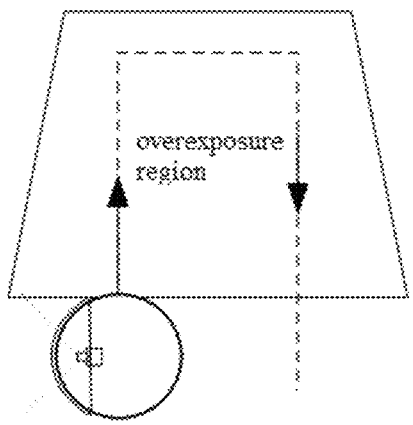

In another example, when the image acquisition device is fixed on the robot, the processing device controls the robot to deflect by an angle such that the robot avoids facing the overexposure region. Since the image acquisition device is fixed on the robot, the robot deflecting by an angle indicates that the image acquisition device deflects by an angle along with the deflection of the robot. And, after the robot deflects by an angle, the image acquisition device captures images again and analyzes at least one captured image. In this condition, if the processing device can extract sufficient features used for localization after analysis, the processing device determines the current position of the robot in the actual physical space, and the processing device controls the movement of the mobile robot according to the adjusted angle and the original navigation route. For example, please refer to FIG. 4a and FIG. 4b which are schematic diagrams of the movement of a mobile robot along the original navigation route after the mobile robot deflects by an angle. As shown in FIG. 4a, when the mobile robot senses that it is located in an overexposure region, a trapezoid in the figure represents an overexposure region, the processing device of the robot controls the main body of the robot to deflect by 90° as shown by a rotation arrow in the figure, such that the framing surface of the image acquisition device avoids facing the overexposure region, the processing device localizes the position of the robot under the current deflection pose in the actual physical space according to the features in the images acquired after deflection, and controls the movement system in the mobile robot to move along the original navigation route through modifying the deflection angle generated due to the deflection of the image acquisition device, namely, the state as shown in FIG. 4b. In addition, if the robot deflects by an angle, and the processing device still determines that the image acquisition device faces an overexposure region after analyzing the captured images, the above process of controlling the robot to deflect by an angle is repeated, until the processing device can extract sufficient features used for localization based on the analysis of the newly captured images, and then the processing device continues to control the robot.

In another embodiment, the step that the processing device adjusts a framing surface of the image acquisition device and navigates the mobile robot according to the images captured by the adjusted image acquisition device includes: controlling the image acquisition device to deflect by an angle, and modifying the original navigation route according to the adjusted deflection angle to control the movement of the mobile robot.

Figure 5A:
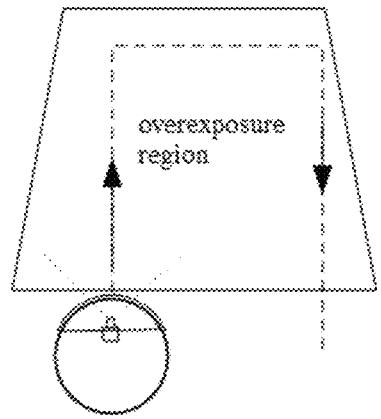
FIGS. 5a-5b show schematic diagrams of the movement of a mobile robot along a newly planned navigation route after the image acquisition device deflects by an angle.
Figure 5B:
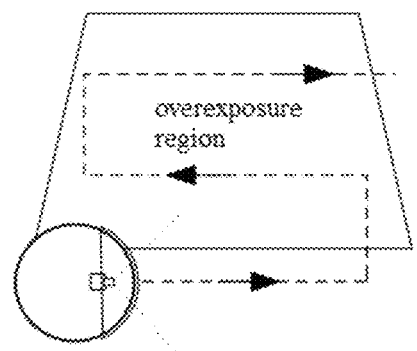

In one example, when the image acquisition device is movably arranged on the robot, the processing device controls the image acquisition device of the robot to deflect by an angle such that the image acquisition device avoids facing the overexposure region. And, after the image acquisition device deflects by an angle, the image acquisition device captures images again and analyzes at least one captured image. In this condition, if the processing device can extract sufficient features used for localization after analysis, the processing device determines the current position of the robot in the actual physical space, and the processing device modifies the original navigation route according to the adjusted angle to avoid navigating under the image acquisition device facing the overexposure region, for example, modifying the section in the overexposure region of the original navigation route. And then, the processing device controls the robot to move according to the modified navigation route based on the determined current position of the robot in the actual physical space and based on the modified navigation route. For example, please refer to FIG. 5a and FIG. 5b which are schematic diagrams of the movement of a mobile robot along a newly planned navigation route after the framing surface of the image acquisition device deflects by an angle. As shown in FIG. 5a, when the robot senses that it is located in an overexposure region, a trapezoid in the figure represents an overexposure region, the processing device modifies the original navigation route as shown in FIG. 5a into a navigation route as shown in FIG. 5b according to the pose after the image acquisition device deflects by an angle and the localized current position, and controls the movement system of the mobile robot according to the modified navigation route. In addition, if the robot deflects by an angle, and the processing device still determines that the image acquisition device faces an overexposure region after analyzing the captured images, the above process of controlling the image acquisition device to deflect by an angle is repeated, until the processing device can extract sufficient features used for localization based on the analysis of the newly captured images, and then the processing device continues to control the robot.

In another example, when the image acquisition device is fixed on the robot, the processing device controls the robot to deflect by an angle, such that the robot avoids facing the overexposure region. Since the image acquisition device is fixed on the robot, the robot deflecting by an angle indicates that the image acquisition device deflects by an angle along with the deflection of the robot. And, after the robot deflects by an angle, the image acquisition device captures images again and analyzes at least one captured image. In this condition, if the processing device can extract sufficient features used for localization after analysis, the processing device determines the current position of the robot in the actual physical space, and the processing device modifies the original navigation route according to the adjusted angle to avoid navigating under the image acquisition device facing the overexposure region, for example, modifying the section in the overexposure region of the original navigation route. And then, the processing device controls the robot to move according to the modified navigation route based on the determined current position of the robot in the actual physical space and based on the modified navigation route. In addition, if the robot deflects by an angle, and the processing device still determines that the image acquisition device faces an overexposure region after analyzing the captured images, the above process of controlling the robot to deflect by an angle is repeated, until the processing device can extract sufficient features used for localization based on the analysis of the newly captured images, and then the processing device continues to control the robot.

It should be noted that, the manner of controlling the image acquisition device or robot to deflect by an angle is merely exemplary, in fact, the processing device can keep off the overexposure region through controlling the image acquisition device to move up and down, and this will not be recited herein.

In still another embodiment, the step that the processing device controls the movement of the mobile robot after analyzed that the image acquisition device faces an overexposure region includes: shielding the image provided by the image acquisition device, and controlling the movement of the mobile robot according to the original navigation route.

Wherein, the manner of shielding the image provided by the image acquisition device can include: closing the image acquisition device and not acquiring the image data in the overexposure region, or not analyzing the images captured by the image acquisition device. When the images provided by the image acquisition device are shielded, the processing device controls the robot to move according to the original navigation route based on the movement data provided by the movement sensing device in the mobile robot, wherein the movement sensing device is configured to acquire the movement information of the mobile robot. The movement sensing device includes but is not limited to a displacement sensor, a gyroscope, a speed sensor, a ranging sensor, an optical floor tracking sensor and a cliff sensor. During the movement of the mobile robot, the movement sensing device continuously senses movement information and provides them for the processing device. According to the type and number of the sensors arranged in the robot, the movement information acquired by the processing device includes but is not limited to: displacement information, angle information, information about distance between robot and an obstacle, velocity information and advancing direction information.

In still another embodiment, the step that the processing device controls the movement of the mobile robot after analyzed that the image acquisition device faces an overexposure region includes: adjusting the amount of incoming light in the image acquisition device and navigating the mobile robot according to the images captured by the adjusted image acquisition device.

Since overexposure is caused by too strong light, the intensity of the light acquired by the image acquisition device can be changed through reducing the amount of incoming light. After the amount of incoming light is compensated, the image acquisition device captures images and the mobile robot can be navigated based on the captured images.

In one example, the image acquisition device can include an adjustable aperture. The processing device reduces the amount of incoming light through adjusting the aperture, wherein the aperture is usually arranged in the image acquisition device, and configured to adjust the amount of light entering the image acquisition device. For example, when the processing device determines that the image acquisition device faces an overexposure region after analysis, the processing device controls to reduce the size of aperture, and in this case, the processing device can control the image acquisition device to capture images again and perform analysis and navigation operation. In addition, Besides adjusting the aperture size, the processing device can also adjust the exposure time of the image acquisition device to reduce the amount of incoming light.

In another example, the image acquisition device can include a mask used for light-blocking. The processing device reduces the amount of incoming light through adjusting the position of the mask, wherein, the mask is a light-tight panel which can reduce the influence of the light on objects and avoid perpendicular incidence of external light. The mask can be arranged above the image acquisition device, or below the image acquisition device, or at the side face of the image acquisition device, and used for adjusting the amount of light entering the image acquisition device. For example, with the mask being arranged above the image acquisition device as an example, when the processing device determines that the image acquisition device faces an overexposure region, the processing device controls the mask to move downward so as to cover part of the lens of the image acquisition device, at this point, the amount of incoming light is reduced, and the processing device can control the image acquisition device to capture images again and perform analysis and navigation operation.

In still another example, the image acquisition device can include both an adjustable aperture and a mask. The processing device reduces the amount of incoming light through adjusting the aperture and adjusting the position of a mask.

As to the control system of the mobile robot in the present application, through the technical solution in which a processing device is used to analyze the images captured by the image acquisition device, and when the image acquisition device is determined to face an overexposure region based on grayscale features, the navigation and pose of the robot can be determined through adjusting the framing surface of the image acquisition device or shielding the images provided by the image acquisition device, the mobile robot can be navigated and controlled when the image acquisition device faces an overexposure region, thereby solving the problem that the robot cannot determine the navigation and pose thereof based on the acquired visual information due to lighting problems.

In addition, in practical applications, the image acquisition device can be subjected to instant overexposure or automatic exposure compensation. When the image acquisition device is subjected to instant overexposure, in order to prevent the interference of instant overexposure on the processing device in judging the overexposure region, the processing device can analyze at least two images which are acquired by the image acquisition device in a time sequence though any of the above overexposure analysis methods so as to determine that the image acquisition device faces an overexposure region. For example, when the processing device detects that one image is overexposed, and continuously detects that at least one image subsequently captured by the image acquisition device is also overexposed, then the processing device determines that the image acquisition device faces an overexposure region. When the image acquisition device can perform automatic exposure compensation, since the image acquisition device has a function of exposure automatic compensation, the image acquisition device will be firstly subjected to automatic exposure compensation on the occasion of exposure. Therefore, when the exposure can be compensated, the processing device only needs to analyze the images captured after exposure compensation and moves according to the original navigation route.

Therefore, in order to avoid the above two conditions, in one embodiment, the step that the processing device controls the movement of the mobile robot after analyzed that the image acquisition device faces an overexposure region includes: the processing device controls the movement of the mobile robot after analyzed that the time during which the image acquisition device faces the overexposure region is longer than a preset time, wherein the preset time can be longer than the time required for exposure compensation.

Figure 6:
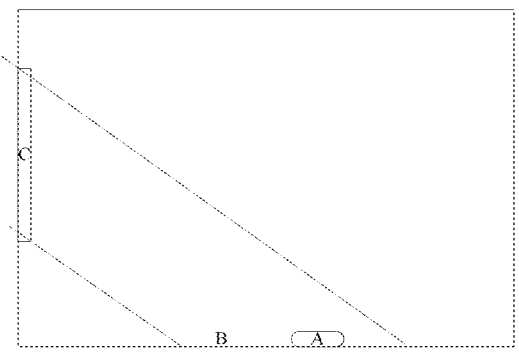
FIG. 6 shows a schematic diagram showing that an image acquisition device in a control system of a mobile robot of the present application faces an overexposure region.

With the cleaning robot as an example, the control process of the control system in the present application on the navigation and pose of the mobile robot is described. Please refer to FIG. 6 which is a schematic diagram showing that an image acquisition device in a control system of a mobile robot of the present application faces an overexposure region. As shown in the figure, A represents a cleaning robot, C represents a window, B represents an overexposure region formed when sunlight enters indoors after penetrating through the window C. In one example, when the cleaning robot moves along the direction toward window C to enter the overexposure region B, since the time during which the image acquisition device of the cleaning robot faces the overexposure region B is longer, the image acquisition device cannot realize automatic exposure compensation. In this case, the processing device can adjust the framing surface of the image acquisition device, and navigate the robot according to the images captured by the adjusted image acquisition device. Or, the processing device can shield the images provided by the image acquisition device, and control the movement of the robot according to the original navigation route based on the movement data provided by the movement sensing device. Or the processing device can reduce the amount of incoming light of the image acquisition device through adjusting the aperture or adjusting the position of the mask, and navigate the robot according to the images captured by the adjusted image acquisition device.

Figure 7:
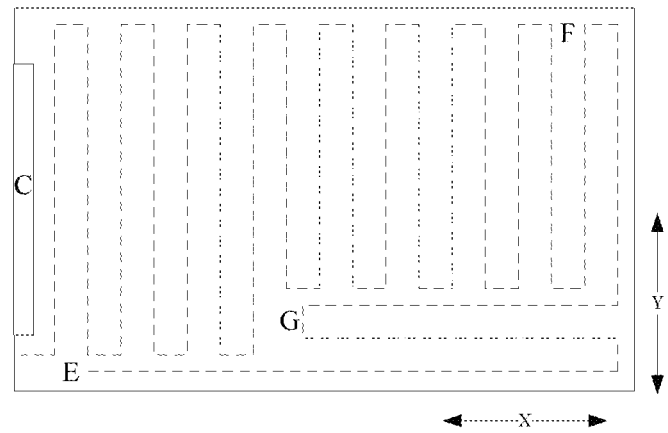
FIG. 7 shows a schematic diagram showing that the navigation route is modified by the control system of a mobile robot of the present application when an image acquisition device faces an overexposure region shown in FIG. 6.

In another example, the processing device can adjust the framing surface of the image acquisition device, and navigate the robot according to the images captured by the adjusted image acquisition device. Specifically, the processing device can control the image acquisition device to deflect by an angle, and modify the original navigation route according to the adjusted deflection angle so as to control the movement of the robot. Please refer to FIG. 7 which is a schematic diagram showing that the navigation route is modified by the control system of the mobile robot of the present application when the image acquisition device faces the overexposure region shown in FIG. 6. As shown in the figure, suppose that the original navigation route E of the robot is as shown by the horizontal direction (namely, the direction shown by an arrow X in the figure) in the figure, the robot moves along the original navigation route E in the initial situation, when the image acquisition device of the robot is determined to face an overexposure region (not shown in the figure) during the movement process, at this time, suppose that the robot moves to the position G of the original navigation route, then the processing device controls the image acquisition device to deflect by an angle (for example, deflecting by 90° as shown in the figure), and modifies the original navigation route E to a new navigation route F according to the adjusted deflection angle, the new navigation route F is as shown by the vertical direction (namely, the direction shown by an arrow Y in the figure) in the figure, and it can be seen from the figure that the new navigation route F completely avoids the section in the overexposure region of the original navigation route E. And then, the robot moves according to the new navigation route F. It should be noted that, the original navigation route E and the new navigation route F described in FIG. 7 of the present application are merely exemplary, while in various practical implementation states, the control system of the mobile robot can adopt other forms of navigation routes according to the navigation operating environment.

The present application further provides a method for controlling a mobile robot, namely, a control method of a mobile robot. The mobile robot includes an image acquisition device. The image acquisition device is used to capture images in real time under a navigation operating environment of the mobile robot. The image acquisition device includes but is not limited to a camera, a video camera, an image acquisition module integrated with an optical system or a CCD chip, and an image acquisition module integrated with an optical system and a CMOS chip. A power supply system of the image acquisition device can be controlled by a power supply system of the mobile robot. During movement of the robot when being powered on, the image acquisition device starts to capture images. In addition, the image acquisition device can be arranged on the main body of the mobile robot. For example, with a cleaning robot as an example, the image acquisition device can be arranged in the middle or at the edge of the top cover of the cleaning robot, or the image acquisition device can be arranged below the plane of the top surface of the cleaning robot, and in a concave structure near the geometric center of the main body or near the edge of the main body. In some embodiments, the image acquisition device can be arranged on the top surface of the mobile robot, and the angle between the optic axis of the field of view of the image acquisition device and the vertical line is ±30°. For example, the image acquisition device is located in the middle or at the edge of the top surface of the cleaning robot, and the angle between the optic axis of the image acquisition device and the vertical line is −30°, −29°, −28°, −27° . . . −1°, 0°, 1°, 2° . . . 29° or 30°. It should be noted that, those skilled in the art should understand that the angle between the optic axis and the vertical line or the horizontal line is only an example but not to limit the accuracy of the angle thereof within the range of 1°. The accuracy of the angle can be higher according to the actual design requirements of the robot, for example, more than 0.1°, 0.01° or the like. Endless examples will not be recited herein.

Figure 8:
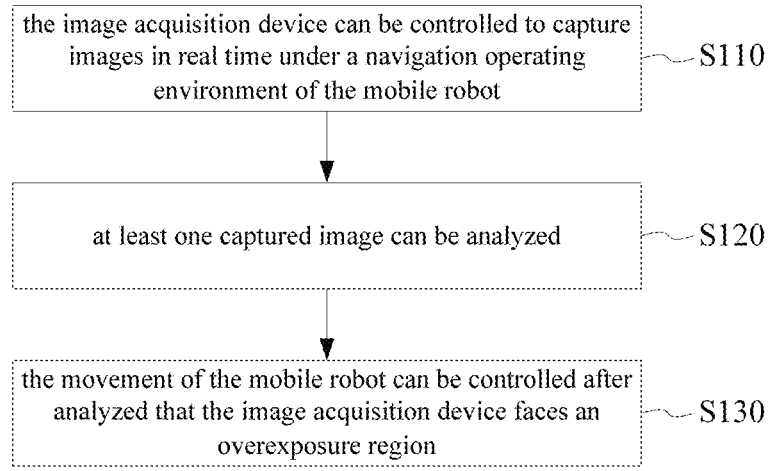
FIG. 8 shows a flow chart of a control method of a mobile robot of the present application in one embodiment.

Please refer to FIG. 8 which shows a flow chart of a control method of a mobile robot of the present application in one embodiment. The control method is executed by a control system. The control system can be configured in a mobile robot. The control system can be the control system as shown in FIG. 1 and the above description corresponding to FIG. 1, or other control systems which can execute the control method. The control method includes Step 110, Step 120 and Step 130.

Here, Step 110, Step 120 and Step 130 can be executed by processing device. The processing device can include one or more processors. The processing device can be operably coupled to a volatile memory and/or a non-volatile memory in the storage device. The processing device can execute instructions stored in the storage and/or non-volatile memory to perform operations in the robot, for example, analyzing the captured images and determining the navigation and pose of the robot based on the analyzed results. Thus, the processor can include one or more general-purpose microprocessors, one or more application specific integrated circuits (ASIC), one or more digital signal processors (DSP), one or more field programmable gate arrays (FPGA) or any combination thereof. The processing device is also operably coupled to an I/O port and an input structure, wherein the robot can interact with various other electronic apparatus by the I/O port, and the user can interact with a computing apparatus by the input structure. Therefore, the input structure can include a button, a keyboard, a mouse, a touchpad and the like. The other electronic apparatus can be a mobile motor in the movement device of the robot, or a slave processor dedicated to the control of the movement device in the robot, for example, a microcontroller unit (MCU).

In an example, the processing device is connected with the storage device and the image acquisition device respectively through data cables. The processing device interacts with the storage device through a data read-write technology, and the processing device interacts with the image acquisition device through an interface protocol. Wherein the data read-write technology includes but is not limited to a high-speed/low-speed data interface protocol, a database read-write operation and the like. The interface protocol includes but is not limited to an HDMI interface protocol, a serial interface protocol and the like.

In Step 110, the image acquisition device can be controlled to capture images in real time under a navigation operating environment of the mobile robot.

Herein, the processing device can control the image acquisition device to capture images in real time under a navigation operating environment of the mobile robot. For example, the image acquisition device can be a camera used for capturing static image or video. In one embodiment, the mobile robot can preset the time interval for capturing image according to the navigation operating environment, and then the processing device controls the image acquisition device to capture image at the preset time interval to acquire static images at different time. In another embodiment, the processing device controls the image acquisition device to capture video.

Wherein, the navigation operating environment indicates the environment in which the robot moves according to the current localization and the navigation route determined based on the current localization and performs corresponding operations. For example, with a patrol robot as an example, the navigation operating environment indicates the environment in which a patrol robot moves according to a navigation route and performs security operations; and with a cleaning robot as an example, the navigation operating environment indicates the environment in which a cleaning robot moves according to a navigation route and performs cleaning operations.

In Step 120, at least one captured image can be analyzed.

Herein, the processing device analyzes at least one captured image. Wherein, when the images acquired by the image acquisition device are static images, the processing device can analyze at least one image in the acquired static images. When the image acquisition device acquires video, since the video is composed of image frames, the processing device can firstly continuously or discontinuously collect image frames in the acquired video, and then select one frame of image to serve as an image for analysis. The processing device determines the region which the image acquisition device of the mobile robot faces by performing an analysis on one or more images.

In Step 130, the movement of the mobile robot can be controlled after analyzed that the image acquisition device faces an overexposure region.

Herein, when the image acquisition device is determined to face an overexposure region after analysis, the processing device controls the movement of the mobile robot. In the present application, the overexposure region is a geographic region, for example, a highlight region formed when sunlight irradiates onto the surface or a highlight region formed when a spot light projects onto the surface. The overexposure region indicates that the amount of incoming light of the image acquisition device of the mobile robot is excessive when the image acquisition device 12 faces a region with a strong light or faces a light source, which leads to the brightness contained in the captured images is higher than a preset brightness threshold, namely, leads to there is overexposure point in the images, such that the processing device cannot extract sufficient features used for localization based on the acquired images, wherein the brightness contained in the captured image can be described via image grayscale values. For example, when the processing device detects that the grayscale value of a region contained in the image is greater than a preset grayscale threshold, the image can be determined to be an overexposure image, then the image acquisition device 12 of the mobile robot can be determined to face the overexposure region. In some embodiments, the brightness can be described via light intensity values provided by an illumination sensor in the image acquisition device, for example, the processing device acquires images and corresponding light intensity data, the processing device determines that the mobile robot faces an overexposure region when the light intensity data is greater than a preset light intensity threshold. Or, in some embodiments, the processing device determines whether the mobile robot faces an overexposure region based on both the grayscale values and light intensity data in the image. For example, the processing device determines that the mobile robot faces an overexposure region in a way of simultaneously satisfying two conditions in the above two examples.

When the image acquisition device is determined to face an overexposure region, the movement of the mobile robot is controlled. Herein, determining the navigation of the mobile robot includes determining the navigation route of the mobile robot. Determining the pose of the mobile robot includes determining the position and orientation of the mobile robot, wherein the orientation of the mobile robot can be for example the deflection angle between the movement direction of the mobile robot and the image acquisition device of the mobile robot. When the image acquisition device faces an overexposure region, because the light is too strong, the processing device cannot identify sufficient features used for localization from the images and cannot determine the subsequent navigation and pose of the mobile robot. Therefore, the processing device needs to adjust the navigation and pose of the mobile robot according to actual conditions, such that the image acquisition device can control the mobile robot when facing an overexposure region.

As to the control method of the mobile robot in the present application, through the technical solution that analyzing the captured images and redetermining the navigation and pose of the robot after analyzed that the image acquisition device faces an overexposure region, the navigation of the mobile robot can be controlled when the image acquisition device faces the overexposure region, thereby solving the problem that the robot cannot determine the navigation and pose thereof based on the acquired images due to lighting problems.

In order to localize the current position of the mobile robot accurately, the Step 120 includes: determining the current position of the mobile robot based on the features identified in at least one image, wherein the features include but are not limited to shape features and grayscale features. The shape features include but are not limited to corner features, line features, edge features and curve features. The grayscale features include but are not limited to grayscale jump features, grayscale values greater than or less than a grayscale threshold, region dimensions of a preset grayscale range contained in the image frames. In addition, in order that the mobile robot can acquire sufficient features used for localization based on the images, and determine the navigation and pose thereof, the number of features identified in the images is multiple, for example, more than 10.

In one embodiment, the processing device can determine the current position of the mobile robot based on the features identified in one image. For example, the localization information of the robot in the current physical space is acquired through identifying the pattern of an object in the captured image and matching that pattern with the pattern of a standard component and determining the localization information based on standard physical features of the standard component. For another example, the localization information of the robot in the current physical space is determined through matching the features identified in the image with the features in landmark information in the preset map data. In another embodiment, the processing device can determine the current position of the mobile robot based on the features identified in at least two images. For example, the position and pose of the robot can be determined based on the position offset information of the matching features in two image frames.

In addition, when localization analysis is performed based on at least one captured image, not necessarily limited by a time sequence, whether the image acquisition device faces the overexposure region can be determined based on the grayscale features in at least one image. In practical applications, when the image acquisition device faces the overexposure region, the processing device may not obtain sufficient features used for localization from the captured images, or the obtained features used for localization are not accurate. With cleaning robot as an example, if the cleaning robot cannot be localized accurately under the influence that the image acquisition device faces the overexposure region, the following problems can occur due to localization errors: the cleaning robot cannot move nearby a window in a room, so that the corresponding surface is not cleaned; or the cleaning robot may collide with the wall when moving to the wall by the window, so that the cleaning robot cannot adjust the pose timely to clean the surface (for example, adjust the pose such that the side brush is on the side of the wall).

Therefore, the processing device can analyze whether the image acquisition device faces the overexposure region. Herein, the images captured by the image acquisition device are usually of an RGB color mode, thus, the processing device should perform grayscale processing on the captured images to obtain grayscale images, and then the grayscale images are subjected to overexposure analysis to determine whether the image acquisition device faces the overexposure region. Wherein, the processing device can perform grayscale processing on the captured images to obtain grayscale images through component method, a maximum value method, a mean value method or a weighted mean method and so on. Grayscale image is monochrome image with 256 gray levels or scales from black to white, wherein 255 represents white and 0 represents black.

In one embodiment, the processing device determines whether the image acquisition device faces an overexposure region through an analysis, in the grayscale image, on the grayscale distribution, gray average, maximum and minimum grayscale values, and the area proportion of a region with larger grayscale to the whole image region.

In one example, in the case that the grayscale feature is represented by grayscale distribution, when the processing device analyzes the grayscale distribution in the grayscale images and determines that the grayscale distribution is centered in a preset grayscale overexposure interval, the processing device determines that the image acquisition device faces the overexposure region. For example, the grayscale overexposure interval can be obtained according to technical experiences or experimental designs and is stored in the mobile robot in advance.

In another example, in order to prevent excessive control of the pose and navigation of the mobile robot, when determining that the image includes grayscale values falling within the grayscale overexposure interval, the processing device further analyzes whether the area proportion of a pixel region corresponding to the grayscale values falling within the overexposure region to the whole image is greater than a preset proportion threshold, if so, the processing device cannot extract sufficient features, if not, the processing device determines that the image acquisition device does not face the overexposure region, wherein the grayscale overexposure interval and preset proportion threshold can be obtained according to technical experiences or experimental designs and are stored in the mobile robot in advance. In addition, the range of the area proportion can be determined according to the actual conditions of the navigation operating environment, as long as the condition that the processing device cannot extract sufficient features is satisfied.

However, in the case that the situation does not belong to a common situation which can cause the above overexposure under the influence of light such as the image captured by the image acquisition device is a white wall, when the processing device determines whether the image acquisition device faces an overexposure region only based on the grayscale distribution or the area proportion of a region with larger grayscale to the whole image region, there is misjudgment. In order to reduce the above misjudgment, in another embodiment, please refer to FIG. 2 which shows a schematic diagram of the grayscale of an image captured when the image acquisition device in a control system of a mobile robot of the present application faces an overexposure region. When the image acquisition device faces an overexposure region, there is a situation that the grayscale image of the image captured by the image acquisition device is extremely bright in the middle and extremely dark at the edge, and the number of features is not sufficient for localization. In FIG. 2, regions denoted as A, B and C represent regions with different grayscales respectively, wherein A is an extremely bright region and in the middle, with the grayscale being close to 255, C is an extremely dark region and at the edge, with the grayscale being close to 0, the region B between region A and region C is a region with a higher grayscale, and sufficient features used for localization cannot be extracted from the above A, B, and C regions. Therefore, when the grayscale image of the image captured by the image acquisition device is extremely bright in the middle and extremely dark at the edge and has no feature information, the processing device determines that the image acquisition device faces an overexposure region.

It should be noted that, determining whether the image acquisition device faces an overexposure region based on the above one or more analyzing methods is only an example but not to limit the methods for determining whether the image acquisition device faces an overexposure region in the present application. In fact, those skilled in the art can determine whether the image acquisition device faces an overexposure region through evaluating whether the image acquisition device faces an overexposure region based on the results obtained by multiple grayscale analysis methods. These methods will not be described one by one herein. However, the method for determining that the image acquisition device faces an overexposure region based on the analysis on any of image grayscale values mentioned in the present application or based on the improvement on the image grayscale values should be deemed as a specific example of the present application.

In one embodiment, the Step 130 includes: adjusting the framing surface of the image acquisition device, and navigating the mobile robot according to the images captured by the adjusted image acquisition device.

Wherein a framing surface of the image acquisition device mainly indicates a plane or a sphere which is vertical to the optical axis of the image acquisition device and where the image focused in the image acquisition device by means of an optical system in the image acquisition device. When the processing device analyzed that the image acquisition device faces an overexposure region, the processing device cannot acquire sufficient and accurate features from the captured images, therefore, the framing surface of the image acquisition device needs to be adjusted, so as to avoid localization errors caused by the overexposure region.

In one embodiment, the step of adjusting the framing surface of the image acquisition device and navigating the mobile robot according to the images captured by the adjusted image acquisition device includes: controlling the image acquisition device to deflect by an angle, and controlling the movement of the mobile robot according to the adjusted deflection angle and the original navigation route.

In one example, the image acquisition device can be movably arranged on the robot, wherein the movable manner includes horizontal rotation, up and down movement, pitching rotation or any combination thereof. Wherein, horizontal rotation of the image acquisition device indicates a movement that the image acquisition device rotates 360 degrees around a vertical line which is vertical to the horizontal surface. Pitching rotation of the image acquisition device indicates a movement that the angle between the optical axis of the image acquisition device and the horizontal surface is changed. The up and down movement of the image acquisition device indicates a movement that the image acquisition device moves up and down in the direction of a vertical line which is vertical to the horizontal surface. Herein, the image acquisition device can be arranged on a robot via a steering mechanism (for example, a cardan shaft) to realize any deflection movement. The image acquisition device can be arranged on the robot via a telescoping mechanism (for example, a lead screw) to realize up and down movement. For example, the above movable image acquisition device can be arranged in the middle or at the edge of the top cover of the cleaning robot.

When the image acquisition device is movably arranged on the robot, the processing device controls the robot to deflect by an angle such that the robot avoids facing the overexposure region. And, after the image acquisition device deflects by an angle, the image acquisition device captures images again and analyzes at least one captured image. In this condition, if the processing device can extract sufficient features used for localization after analysis, the processing device determines the current position of the robot in the actual physical space, and the processing device controls the movement of the mobile robot according to the adjusted angle and the original navigation route. For example, please refer to FIG. 3a and FIG. 3b which are schematic diagrams of the movement of a mobile robot along the original navigation route after the image acquisition device deflects by an angle. As shown in FIG. 3a, when the robot senses that it is located in an overexposure region, a trapezoid in the figure represents an overexposure region, the processing device of the robot controls the image acquisition device of the robot to deflect by 90° as shown by a rotation arrow in the figure, such that the framing surface of the image acquisition device avoids facing the overexposure region, the processing device localizes the position of the robot under the current deflection pose in the actual physical space according to the features in the images acquired after deflection, and controls the movement system in the mobile robot to move along the original navigation route through modifying the deflection angle generated due to the deflection of the image acquisition device, namely, the state as shown in FIG. 3b. In addition, if the image acquisition device deflects by an angle, and the processing device still determines that the image acquisition device faces an overexposure region after analyzing the captured images, the above process of controlling the image acquisition device to deflect by an angle is repeated, until the processing device can extract sufficient features used for localization based on the analysis of the newly captured images, and then the processing device continues to control the robot.

In another example, when the image acquisition device is fixed on the robot, the processing device controls the robot to deflect by an angle such that the robot avoids facing the overexposure region. Since the image acquisition device is fixed on the robot, the robot deflecting by an angle indicates that the image acquisition device deflects by an angle along with the deflection of the robot. And, after the robot deflects by an angle, the image acquisition device captures images again and analyzes at least one captured image. In this condition, if the processing device can extract sufficient features used for localization after analysis, the processing device determines the current position of the robot in the actual physical space, and the processing device controls the movement of the mobile robot according to the adjusted angle and the original navigation route. For example, please refer to FIG. 4a and FIG. 4b which are schematic diagrams of the movement of a mobile robot along the original navigation route after the mobile robot deflects by an angle. As shown in FIG. 4a, when the mobile robot senses that it is located in an overexposure region, a trapezoid in the figure represents an overexposure region, the processing device of the robot controls the main body of the robot to deflect by 90° as shown by a rotation arrow in the figure, such that the framing surface of the image acquisition device avoids facing the overexposure region, the processing device localizes the position of the robot under the current deflection pose in the actual physical space according to the features in the images acquired after deflection, and controls the movement system in the mobile robot to move along the original navigation route through modifying the deflection angle generated due to the deflection of the image acquisition device, namely, the state as shown in FIG. 4b. In addition, if the robot deflects by an angle, and the processing device still determines that the image acquisition device faces an overexposure region after analyzing the captured images, the above process of controlling the robot to deflect by an angle is repeated, until the processing device can extract sufficient features used for localization based on the analysis of the newly captured images, and then the processing device continues to control the robot.

In another embodiment, the step of adjusting a framing surface of the image acquisition device and navigating the mobile robot according to the images captured by the adjusted image acquisition device includes: controlling the image acquisition device to deflect by an angle, and modifying the original navigation route according to the adjusted deflection angle to control the movement of the mobile robot.

In one example, when the image acquisition device is movably arranged on the robot, the processing device controls the image acquisition device of the robot to deflect by an angle such that the image acquisition device avoids facing the overexposure region. And, after the image acquisition device deflects by an angle, the image acquisition device captures images again and analyzes at least one captured image. In this condition, if the processing device can extract sufficient features used for localization after analysis, the processing device determines the current position of the robot in the actual physical space, and the processing device modifies the original navigation route according to the adjusted angle to avoid navigating under the image acquisition device facing the overexposure region, for example, modifying the section in the overexposure region of the original navigation route. And then, the processing device controls the robot to move according to the modified navigation route based on the determined current position of the robot in the actual physical space and based on the modified navigation route. For example, please refer to FIG. 5a and FIG. 5b which are schematic diagrams of the movement of a mobile robot along a newly planned navigation route after the framing surface of the image acquisition device deflects by an angle. As shown in FIG. 5a, when the robot senses that it is located in an overexposure region, a trapezoid in the figure represents an overexposure region, the processing device modifies the original navigation route as shown in FIG. 5a into a navigation route as shown in FIG. 5b according to the pose after the image acquisition device deflects by an angle and the localized current position, and controls the movement system of the mobile robot according to the modified navigation route. In addition, if the robot deflects by an angle, and the processing device still determines that the image acquisition device faces an overexposure region after analyzing the captured images, the above process of controlling the image acquisition device to deflect by an angle is repeated, until the processing device can extract sufficient features used for localization based on the analysis of the newly captured images, and then the processing device continues to control the robot.

In another example, when the image acquisition device is fixed on the robot, the processing device controls the robot to deflect by an angle, such that the robot avoids facing the overexposure region. Since the image acquisition device is fixed on the robot, the robot deflecting by an angle indicates that the image acquisition device deflects by an angle along with the deflection of the robot. And, after the robot deflects by an angle, the image acquisition device captures images again and analyzes at least one captured image. In this condition, if the processing device can extract sufficient features used for localization after analysis, the processing device determines the current position of the robot in the actual physical space, and the processing device modifies the original navigation route according to the adjusted angle to avoid navigating under the image acquisition device facing the overexposure region, for example, modifying the section in the overexposure region of the original navigation route. And then, the processing device controls the robot to move according to the modified navigation route based on the determined current position of the robot in the actual physical space and based on the modified navigation route. In addition, if the robot deflects by an angle, and the processing device still determines that the image acquisition device faces an overexposure region after analyzing the captured images, the above process of controlling the robot to deflect by an angle is repeated, until the processing device can extract sufficient features used for localization based on the analysis of the newly captured images, and then the processing device continues to control the robot.

It should be noted that, the manner of controlling the image acquisition device or robot to deflect by an angle is merely exemplary, in fact, the processing device can keep off the overexposure region through controlling the image acquisition device to move up and down, and this will not be recited herein.

In still another embodiment, the Step 130 includes: shielding the image provided by the image acquisition device, and controlling the movement of the mobile robot according to the original navigation route.

Wherein, the manner of shielding the image provided by the image acquisition device can include: closing the image acquisition device and not acquiring the image data in the overexposure region, or not analyzing the images captured by the image acquisition device. When the images provided by the image acquisition device are shielded, the processing device controls the robot to move according to the original navigation route based on the movement data provided by the movement sensing device in the mobile robot, wherein the movement sensing device is configured to acquire the movement information of the mobile robot. The movement sensing device includes but is not limited to a displacement sensor, a gyroscope, a speed sensor, a ranging sensor, an optical floor tracking sensor and a cliff sensor. During the movement of the mobile robot, the movement sensing device continuously senses movement information and provides them for the processing device. According to the type and number of the sensors arranged in the robot, the movement information acquired by the processing device includes but is not limited to: displacement information, angle information, information about distance between robot and an obstacle, velocity information and advancing direction information.

In still another embodiment, the Step 130 includes: adjusting the amount of incoming light in the image acquisition device and navigating the mobile robot according to the images captured by the adjusted image acquisition device.

Since overexposure is caused by too strong light, the intensity of the light acquired by the image acquisition device can be changed through reducing the amount of incoming light. After the amount of incoming light is compensated, the image acquisition device captures images and the mobile robot can be navigated based on the captured images.

In one example, the processing device reduces the amount of incoming light through adjusting the aperture of the image acquisition device, wherein the aperture is usually arranged in the image acquisition device, and configured to adjust the amount of light entering the image acquisition device. For example, when the processing device determines that the image acquisition device faces an overexposure region after analysis, the processing device controls to reduce the size of aperture, and in this case, the processing device can control the image acquisition device to capture images again and perform analysis and navigation operation.

In another example, the processing device reduces the amount of incoming light through adjusting the position of the mask of the image acquisition device, wherein, the mask is a light-tight panel which can reduce the influence of the light on objects and avoid perpendicular incidence of external light. The mask can be arranged above the image acquisition device, or below the image acquisition device, or at the side face of the image acquisition device, and used for adjusting the amount of light entering the image acquisition device. For example, with the mask being arranged above the image acquisition device as an example, when the processing device determines that the image acquisition device faces an overexposure region, the processing device controls the mask to move downward so as to cover part of the lens of the image acquisition device, at this point, the amount of incoming light is reduced, and the processing device can control the image acquisition device to capture images again and perform analysis and navigation operation.

In still another example, the processing device reduces the amount of incoming light through adjusting the aperture of the image acquisition device and adjusting the position of a mask of the image acquisition device.

As to the control method of the mobile robot in the present application, through the technical solution that analyzing the captured images, and when the image acquisition device is determined to face an overexposure region based on gray-scale features, the navigation and pose of the robot can be determined through adjusting the framing surface of the image acquisition device or shielding the images provided by the image acquisition device, the mobile robot can be navigated and controlled when the image acquisition device faces an overexposure region, thereby solving the problem that the robot cannot determine the navigation and pose thereof based on the acquired visual information due to lighting problems.

In addition, in practical applications, the image acquisition device can be subjected to instant overexposure or automatic exposure compensation. When the image acquisition device is subjected to instant overexposure, in order to prevent the interference of instant overexposure on the processing device in judging the overexposure region, the processing device can analyze at least two images which are acquired by the image acquisition device in a time sequence though any of the above overexposure analysis methods so as to determine that the image acquisition device faces an overexposure region. For example, when the processing device detects that one image is overexposed, and continuously detects that at least one image subsequently captured by the image acquisition device is also overexposed, then the processing device determines that the image acquisition device faces an overexposure region. When the image acquisition device can perform automatic exposure compensation, since the image acquisition device has a function of exposure automatic compensation, the image acquisition device will be firstly subjected to automatic exposure compensation on the occasion of exposure. Therefore, when the exposure can be compensated, the processing device only needs to analyze the images captured after exposure compensation and moves according to the original navigation route.

Therefore, in order to avoid the above two conditions, in one embodiment, the Step 130 includes: the processing device controls the movement of the mobile robot after analyzed that the time during which the image acquisition device faces the overexposure region is longer than a preset time, wherein the preset time can be longer than the time required for exposure compensation.

With the cleaning robot as an example, the control process of the control system in the present application on the navigation and pose of the mobile robot is described. Please refer to FIG. 6 which is a schematic diagram showing that an image acquisition device in a control system of a mobile robot of the present application faces an overexposure region. As shown in the figure, A represents a cleaning robot, C represents a window, B represents an overexposure region formed when sunlight enters indoors after penetrating through the window C. In one example, when the cleaning robot moves along the direction toward window C to enter the overexposure region B, since the time during which the image acquisition device of the cleaning robot faces the overexposure region B is longer, the image acquisition device cannot realize automatic exposure compensation. In this case, the processing device can adjust the framing surface of the image acquisition device, and navigate the robot according to the images captured by the adjusted image acquisition device. Or, the processing device can shield the images provided by the image acquisition device, and control the movement of the robot according to the original navigation route based on the movement data provided by the movement sensing device. Or the processing device can reduce the amount of incoming light of the image acquisition device through adjusting the aperture or adjusting the position of the mask, and navigate the robot according to the images captured by the adjusted image acquisition device.

In another example, the processing device can adjust the framing surface of the image acquisition device, and navigate the robot according to the images captured by the adjusted image acquisition device. Specifically, the processing device can control the image acquisition device to deflect by an angle, and modify the original navigation route according to the adjusted deflection angle so as to control the movement of the robot. Please refer to FIG. 7 which is a schematic diagram showing that the navigation route is modified by the control system of the mobile robot of the present application when the image acquisition device faces the overexposure region shown in FIG. 6. As shown in the figure, suppose that the original navigation route E of the robot is as shown by the horizontal direction (namely, the direction shown by an arrow X in the figure) in the figure, the robot moves along the original navigation route E in the initial situation, when the image acquisition device of the robot is determined to face an overexposure region (not shown in the figure) during the movement process, at this time, suppose that the robot moves to the position G of the original navigation route, then the processing device controls the image acquisition device to deflect by an angle (for example, deflecting by 90° as shown in the figure), and modifies the original navigation route E to a new navigation route F according to the adjusted deflection angle, the new navigation route F is as shown by the vertical direction (namely, the direction shown by an arrow Y in the figure) in the figure, and it can be seen from the figure that the new navigation route F completely avoids the section in the overexposure region of the original navigation route E. And then, the robot moves according to the new navigation route F. It should be noted that, the original navigation route E and the new navigation route F described in FIG. 7 of the present application are merely exemplary, while in various practical implementation states, the control system of the mobile robot can adopt other forms of navigation routes according to the navigation operating environment.

The present application further provides a mobile robot. Please refer to FIG. 9 which shows a structural schematic diagram of a mobile robot of the present application in one embodiment. As shown in the figure, the mobile robot includes an image acquisition device 23, a control system 21 and a movement system 22, wherein the movement system 22 and the image acquisition device 23 are both connected with the control system 21. The control system 21 is configured to determine that the image acquisition device faces an overexposure region based on at least one image captured by the image acquisition device 23, and output movement instructions based on the control of the movement of the mobile robot, and the movement system 22 is configured to drive the mobile robot to move based on the movement instructions, wherein the movement instructions are those generated based on the adjusted navigation and pose. The movement instructions include but are not limited to movement direction, movement speed and movement distance determined according to the adjusted navigation route and the current position.

The image acquisition device 23 includes but is not limited to a camera, a video camera, an image acquisition module integrated with an optical system or a CCD chip, and an image acquisition module integrated with an optical system and a CMOS chip. A power supply system of the image acquisition device 23 can be controlled by a power supply system of the mobile robot. During movement of the robot when being powered on, the image acquisition device starts to capture images. In addition, the image acquisition device can be arranged on the main body of the mobile robot. For example, with a cleaning robot as an example, the image acquisition device 23 can be arranged in the middle or at the edge of the top cover of the cleaning robot, or the image acquisition device 23 can be arranged below the plane of the top surface of the cleaning robot, and in a concave structure near the geometric center of the main body or near the edge of the main body. In some embodiments, the image acquisition device 23 can be arranged on the top surface of the mobile robot, and the angle between the optic axis of the field of view of the image acquisition device and the vertical line is ±30°. For example, the image acquisition device is located in the middle or at the edge of the top surface of the cleaning robot, and the angle between the optic axis of the image acquisition device and the vertical line is −30°, −29°, −28°, −27° . . . −1°, 0°, 1°, 2° . . . 29° or 30°. It should be noted that, those skilled in the art should understand that the angle between the optic axis and the vertical line or the horizontal line is only an example but not to limit the accuracy of the angle thereof within the range of 1°. The accuracy of the angle can be higher according to the actual design requirements of the robot, for example, more than 0.1°, 0.01° or the like. Endless examples will not be recited herein.

The movement system includes a drive control device and at least two sets of rolling wheels, wherein at least one set of rolling wheels in at least two sets of rolling wheels is a set of controlled rolling wheels. The drive control device is connected with the control system, and is configured to drive the set of controlled rolling wheels to roll based on the navigation route and the pose determined by the control system.

The drive control device includes a drive motor, and the drive motor is connected with the sets of rolling wheels and is configured to directly drive the sets of rolling wheels to roll. The drive control device can include one or more processors (CPU) or micro processing units (MCU) dedicated to the control of the drive motor. For example, the micro processing unit is configured to convert the information or data provided by the control system into electric signals which control the drive motor, and control the rotating speed and steering of the drive motor according to the electric signals so as to adjust the movement speed and movement direction of the mobile robot. The information or data can be the deflection angle determined by the control system. The processor in the drive control device can be shared with the processor in the processing device in the control system or can be arranged independently. For example, the drive control device is used as a slave processing device, the processing device in the control system is used as a primary device, and the drive control device performs movement control based on the control of the control system. Or the drive control device is shared with the processor in the control system. The drive control device receives data provided by the control system through a program interface. The drive control device is configured to control the roll of the set of controlled rolling wheels based on the navigation route and deflection angle provided by the control system.

In one embodiment, the control system can perform control operation as shown in FIG. 1 and in combination with the above description corresponding to FIG. 1, and this will not be described in detail herein. Wherein, the storage device 211 shown in FIG. 9 can be corresponding to the storage device 11 shown in FIG. 1; the image acquisition device 23 shown in FIG. 9 can be corresponding to the image acquisition device 6 shown in FIG. 1; and the processing device 213 shown in FIG. 9 can be corresponding to the processing device 13 shown in FIG. 1. With the control system 21 shown in FIG. 9 including a storage device 211 and a processing device 213, and the control system 21 being connected with a movement system 22 as an example, the working process in which the robot determines the navigation and pose of the robot based on the control system 21 and further moves is described:

The storage device stores one or more programs. The programs include corresponding programs invoked by the processing device to perform steps such as controlling, analyzing and determining which will be described below.

The image acquisition device captures images in real time under the navigation operating environment of the mobile robot.

The processing device performs control processing through invoking the programs stored in the storage device. Firstly, the processing device controls the image acquisition device to capture images in real time under a navigation operating environment of the mobile robot. For example, the image acquisition device can be a camera used for capturing static images or videos.

And then, the processing device analyzes at least one captured image. The analysis includes determining the current position of the mobile robot based on the features identified in at least one image, and determining whether the image acquisition device faces an overexposure region based on the grayscale features in at least one image. Wherein when the images acquired by the image acquisition device are static images, the processing device can analyze at least one image in the acquired static images. When the image acquisition device acquires videos, since the video is composed of image frames, the processing device can firstly continuously or discontinuously collect image frames in the acquired video, and then select one frame of image to serve as an image for analysis. Wherein the processing device determines the region which the image acquisition device of the mobile robot faces through an analysis on one or more images.

Next, when the image acquisition device is determined to face an overexposure region after analysis, the processing device controls the movement of the mobile robot. Wherein, when the image acquisition device is determined to face an overexposure region after analysis, the processing device adjusts the framing surface of the image acquisition device, and navigates the mobile robot according to the images captured by the adjusted image acquisition device. Or, when the image acquisition device is determined to face an overexposure region after analysis, the processing device shields the image provided by the image acquisition device, and controls the movement of the mobile robot according to the original navigation route. Or when the image acquisition device is determined to face an overexposure region after analysis, the processing device adjusts the amount of incoming light in the image acquisition device and navigates the mobile robot according to the images captured by the adjusted image acquisition device. In addition, in order to avoid instant overexposure or automatic exposure compensation of the image acquisition device, the processing device controls and navigates the movement of the mobile robot after analyzed that the time during which the image acquisition device faces the overexposure region is longer than a preset time, wherein the preset time can be longer than the time required for exposure compensation.

Figure 9:
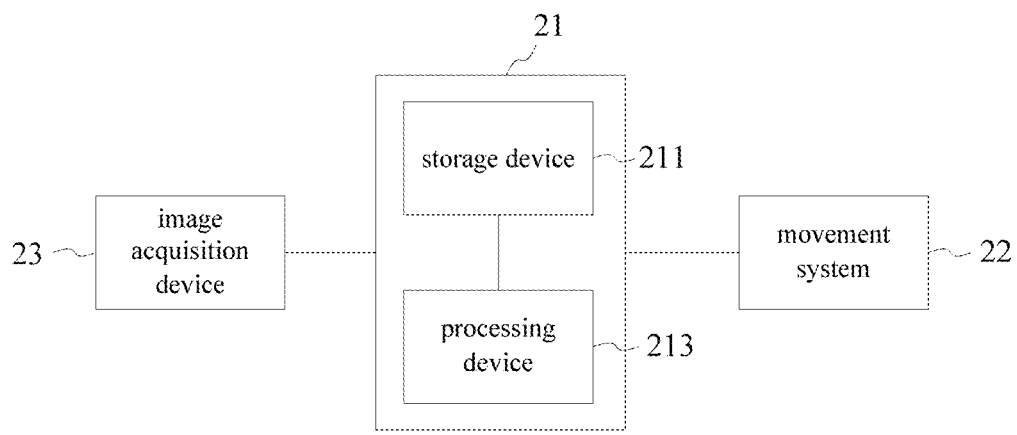
FIG. 9 shows a structural schematic diagram of a mobile robot of the present application in one embodiment.
Figure 10:
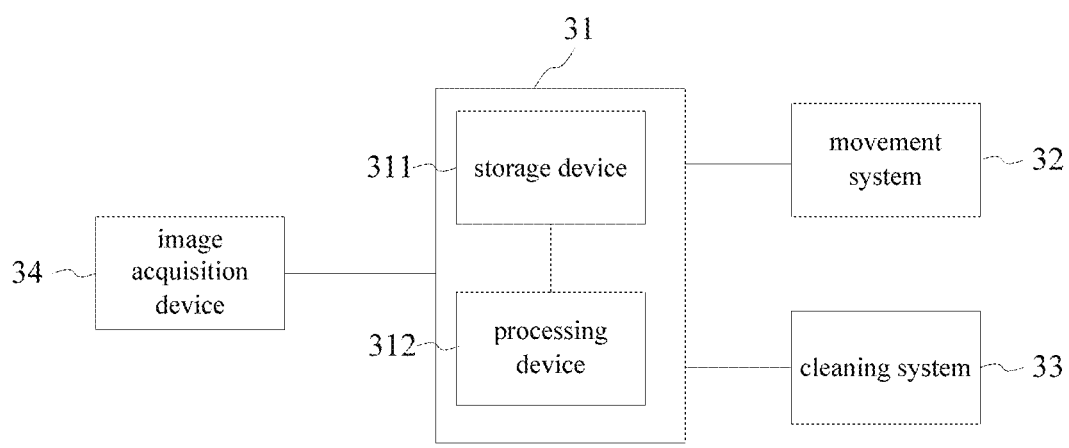
FIG. 10 shows a structural schematic diagram of a cleaning robot of the present application in one embodiment.

The present application further provides a cleaning robot. Please refer to FIG. 10 which shows a structural schematic diagram of a cleaning robot of the present application in one embodiment, wherein the cleaning robot is one type of the above mobile robot. As shown in the figure, the cleaning robot includes an image acquisition device 34, a control system 31, a movement system 32 and a cleaning system 33, wherein the control system 31 is connected with the movement system 32 and the cleaning system 33. The control system 31 is configured to determine that the image acquisition device faces an overexposure region based on at least one image captured by the image acquisition device, and output movement instructions based on the control of the movement of the mobile robot, and the movement system 32 is configured to drive the cleaning robot to move based on the movement instructions, wherein the movement instructions are those generated based on the adjusted navigation and pose. The movement instructions include but are not limited to movement direction, movement speed and movement distance determined according to the adjusted navigation route and the current position. The cleaning system 33 is configured to clean the surface along the route along which the movement system 32 moves.

Wherein the image acquisition device 34 is the same as or similar to the image acquisition device 23 in FIG. 9 and will not be described herein.

The control system 31 control the movement system 32 to move, and the movement system 32 is arranged at the bottom of the cleaning robot. In one embodiment, the movement system 32 includes a drive control device and at least two sets of rolling wheels, wherein the drive control device includes drive motor, and at least one set of rolling wheels in at least two sets of rolling wheels is a set of controlled rolling wheels. The set of controlled rolling wheels which are served as driving wheels of the mobile robot can be driven by the drive motor. Wherein, the set of controlled rolling wheels can be one or more, and each set of controlled rolling wheels is configured with a drive motor. The drive control device can coordinate the rotation speed and rotation of each drive motor to make the cleaning robot move flexibly. The drive control device can include one or more processors (CPU) or micro processing units (MCU) dedicated to the control of the drive motor. For example, the micro processing unit is configured to convert the information or data provided by the control system into electric signals which control the drive motor, and control the rotating speed and steering of the drive motor according to the electric signals so as to adjust the movement speed and movement direction of the mobile robot. The information or data can be the deflection angle determined by the control system. The processor in the drive control device can be shared with the processor in the processing device in the control system or can be arranged independently. For example, the drive control device is used as a slave processing device, the processing device in the control system is used as a primary device, and the drive control device performs movement control based on the control of the control system. Or the drive control device is shared with the processor in the control system. The drive control device receives data provided by the control system through a program interface. The drive control device is configured to control the movement of the driving wheels based on the navigation route and deflection angle provided by the control system.

The control system can perform control operation as shown in FIG. 1 and in combination with the above description corresponding to FIG. 1, and this will not be described in detail herein. Wherein, the storage device 311 shown in FIG. 10 can be corresponding to the storage device 11 shown in FIG. 1; the image acquisition device 34 shown in FIG. 10 can be corresponding to the image acquisition device 6 shown in FIG. 1; and the processing device 312 shown in FIG. 10 can be corresponding to the processing device 13 shown in FIG. 1. With the control system 31 shown in FIG. 10 including a storage device 311 and a processing device 312, the control system 31 being connected with a movement system 32, and the control system 31 being connected with a cleaning system 33 as an example, the working process in which the robot determines the navigation and pose of the robot based on the control system 31 and further performs cleaning is described.

The storage device stores one or more programs. The programs include corresponding programs invoked by the processing device to perform steps such as controlling, analyzing and determining which will be described below.

The image acquisition device captures images in real time under the navigation operating environment of the mobile robot.

The processing device performs control processing through invoking the programs stored in the storage device. Firstly, the processing device controls the image acquisition device to capture images in real time under a navigation operating environment of the mobile robot. For example, the image acquisition device can be a camera used for capturing static images or videos.

And then, the processing device analyzes at least one captured image. The analysis includes determining the current position of the mobile robot based on the features identified in at least one image, and determining whether the image acquisition device faces an overexposure region based on the grayscale features in at least one image. Wherein when the images acquired by the image acquisition device are static images, the processing device can analyze at least one image in the acquired static images. When the image acquisition device acquires videos, since the video is composed of image frames, the processing device can firstly continuously or discontinuously collect image frames in the acquired video, and then select one frame of image to serve as an image for analysis. Wherein the processing device determines the region which the image acquisition device of the mobile robot faces through an analysis on one or more images.

Next, when the image acquisition device is determined to face an overexposure region after analysis, the processing device controls the movement of the mobile robot. Wherein, when the image acquisition device is determined to face an overexposure region after analysis, the processing device adjusts the framing surface of the image acquisition device, and navigates the mobile robot according to the images captured by the adjusted image acquisition device, and control the cleaning component to clean the surface along the route along which the movement system moves. Or, when the image acquisition device is determined to face an overexposure region after analysis, the processing device shields the image provided by the image acquisition device, and controls the movement of the mobile robot according to the original navigation route, and control the cleaning component to clean the surface along the route along which the movement system moves. Or when the image acquisition device is determined to face an overexposure region after analysis, the processing device adjusts the amount of incoming light in the image acquisition device and navigates the mobile robot according to the images captured by the adjusted image acquisition device, and control the cleaning component to clean the surface along the route along which the movement system moves. In addition, in order to avoid instant overexposure or automatic exposure compensation of the image acquisition device, the processing device controls and navigates the movement of the mobile robot after analyzed that the time during which the image acquisition device faces the overexposure region is longer than a preset time, and control the cleaning component to clean the surface along the route along which the movement system moves. wherein the preset time can be longer than the time required for exposure compensation.

The cleaning system includes a cleaning component and a cleaning drive control component, wherein the cleaning drive control component is connected with the control system, and the cleaning drive control component is configured to drive the cleaning component to clean the surface under the control of the control system.

The cleaning component can include a roller brush component, a filter net, a scrubbing component, an inhaling pipeline, a dust collection box (or a garbage box), and an air draft motor, etc. The roller brush component and the scrubbing component can be arranged any one or both of them according to actual design of a cleaning robot. The roller brush component includes but is not limited to a side brush, a side brush driver, a rolling wheel, a rolling wheel driver, etc. The scrubbing component includes but is not limited to a water container, a scrubbing cloth, a configuration structure of the cloth, and a driver of the configuration structure, etc.

The cleaning drive control component can include one or more central processing units (CPU) or micro control units (MCU) dedicated to the control of the cleaning component. The processor in the cleaning drive control component can be shared with the processor in the control system or can be arranged independently. For example, the processor in the cleaning drive control component is used as a slave processing device, the processor in the control system is used as a primary device, and the cleaning drive control component performs cleaning control based on the control of the control system. Or the cleaning drive control component is shared with the processor in the control system.

In one example, the cleaning drive control component is configured to drive the cleaning component to clean the surface under the control of the control system. In addition, when determining the navigation and pose of the cleaning robot, the control system further drives the cleaning component to clean during the movement of the cleaning robot. Or, the cleaning robot further includes a cleaning control system used for controlling the cleaning system, the cleaning control system can share a processing device with the control system 31 or can be arranged independently, the processing device in the cleaning control system shares data with the processing device in the control system 31, such that the processing device in the control system 31 is further configured to output movement instructions including pose control information based on the cleaning control of the cleaning robot on the current navigation route. Wherein, the current navigation route includes a boundary region where the surface (e.g., ground) meets the wall (or other placed objects including the furniture) and/or a corner region where three surfaces are intersected, and an open region in the middle of the ground. The cleaning control includes cleaning control strategies of the boundaries or corners. The movement instructions including pose control information include instruction used for controlling the drive control device to enable the cleaning robot to deflect by a deflection angle, such that the cleaning system can perform corresponding cleaning control strategies. For example, when the cleaning robot moves to the wall under the navigation of the control system, the control system can control the movement system to adjust the current deflection angle, such that the side brush in the cleaning system is close to the wall, and controls the movement system to move according to the adjusted navigation route and pose. Therefore, the side brush in the cleaning system can clean the edge of the wall. The cleaning robot can also clean other corner positions such as the corner of the wall based on the above cleaning control and pose control.

In addition, it should also be noted that, through the description of the above implementations, those skilled in the art can clearly understand that part or all of the present application can be realized by means of software and in combination with necessary general-purpose hardware platforms. Based on this, the present application further provides a storage medium of an computer apparatus, the storage medium stores at least one program, and when the program are executed by processor, the control method described above can be performed.

Based on this understanding, the technical solutions of the present application essentially or the part contributing to the prior art can be embodied in the form of a software product, the computer software product can include one or more machine readable media which store machine executable instructions thereon, when these instructions are executed by one or more machines such as a computer, a computer network or other electronic apparatus, such one or more machines can execute operations based on the embodiments of the present application, for example, executing each step in the control method of the mobile robot, etc. The machine readable media include but are not limited to, a floppy disk, an optical disk, a CD-ROM (a compact disc-read only memory), a magnetic optical disc, an ROM (read-only memory), an RAM (random access memory), an EPROM (erasable programmable read-only memory), an EEPROM (electrically erasable programmable read-only memory), a magnetic card or optical card, a flash memory or other types of media/machine readable media which are applicable to storing machine executable instructions. Wherein the storage media can be located in the mobile robot and can also be located in a third-party server, for example, in a server providing a certain application store. Specific application stores are not limited herein, and can be a MIUI application store, a Huawei application store, and an Apple application store, etc.

The application can be used in numerous general-purpose or special-purpose calculating system environments or configurations, for example, personal computer, server computer, handheld device or portable device, tablet device, multiprocessor system, microprocessor based system, set top box, programmable consumer electronic device, network PC, small-size computer, large-scale computer, and a distributed computing environment containing any of the above system or device.

The present application can be described in the general context of the computer executable instructions executed by the computer, such as a program module. Generally, the program module includes routines, programs, objects, components, data structures and the like which execute particular tasks or realize particular abstract data types. The present application can also be practiced in the distributed computing environments. In these distributed computing environments, tasks are executed by remote processing devices which are connected via a communication network. In the distributed computing environments, the program module can be located in a local and remote computer storage medium including a storage device.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A system for controlling a mobile robot, wherein, the mobile robot comprises an image acquisition device, and the system comprises:
    a storage device, configured to store one or more programs; and
    a processing device, connected with the storage device and configured to perform the following steps through invoking the one or more programs:
        under a navigation operating environment of the mobile robot, controlling the image acquisition device to capture images in real time;
        analyzing at least one captured image; and
        controlling the movement of the mobile robot after analyzing that the image acquisition device faces an overexposure region,
        wherein, the step of controlling the movement of the mobile robot after analyzing that the image acquisition device faces an overexposure region comprises any one of the following steps:
        shielding the image provided by the image acquisition device, and controlling the movement of the mobile robot according to the original navigation route;
        controlling the movement of the mobile robot after analyzing that the time during which the image acquisition device faces an overexposure region is longer than a preset time; and
        adjusting a framing surface of the image acquisition device and navigating the mobile robot according to the images captured by the adjusted image acquisition device,
        wherein, the step of adjusting a framing surface of the image acquisition device and navigating the mobile robot according to the images captured by the adjusted image acquisition device comprises any one of the following steps:
        controlling the image acquisition device to deflect by an angle, and controlling the movement of the mobile robot according to the adjusted deflection angle and the original navigation route; and
        controlling the image acquisition device to deflect by an angle, and modifying the original navigation route according to the adjusted deflection angle to control the movement of the mobile robot.

2. The system for controlling a mobile robot of claim 1, wherein, the step of analyzing at least one captured image comprises: determining the current position of the mobile robot based on the features identified from the at least one image.

3. The system for controlling a mobile robot of claim 1, wherein, the step of analyzing at least one captured image comprises: determining that the image acquisition device faces an overexposure region based on grayscale features in the at least one image.

4. A mobile robot, comprising:
    an image acquisition device;
    the system for controlling a mobile robot of claim 1, configured to determine that the image acquisition device faces an overexposure region based on at least one image captured by the image acquisition device and output movement instructions based on the control of the movement of the mobile robot; and
    a movement system, connected with the control system and configured to drive the mobile robot to move based on the movement instructions.

5. The mobile robot of claim 4, wherein, the movement system comprises:
    at least two sets of rolling wheels, wherein at least one set of rolling wheels is a set of controlled rolling wheels; and
    a drive control device, connected with the system for controlling a mobile robot and configured to drive the set of controlled rolling wheels to roll based on the movement instructions.

6. The mobile robot of claim 4, wherein, the image acquisition device is arranged on the top surface of the mobile robot, and the angle between the optic axis of the field of view of the image acquisition device and the vertical line is ±30°.

7. The mobile robot of claim 4, further comprising:
a cleaning system, connected with the system for controlling a mobile robot and configured to clean the surface along the route along which the movement system moves.

8. The mobile robot of claim 7, wherein, the system for controlling a mobile robot is further configured to output movement instructions containing pose control information based on cleaning control of the cleaning robot on the current navigation route; and
the movement system is used to adjust the movement pose of the cleaning robot based on the movement instructions.

9. A method for controlling a mobile robot, wherein, the mobile robot comprises an image acquisition device, and the method comprises the following steps:
under a navigation operating environment of the mobile robot, controlling the image acquisition device to capture images in real time;
analyzing at least one captured image; and
controlling the movement of the mobile robot after analyzing that the image acquisition device faces an overexposure region,
wherein, the step of controlling the movement of the mobile robot after analyzing that the image acquisition device faces an overexposure region comprises any one of the following steps:
shielding the image provided by the image acquisition device, and controlling the movement of the mobile robot according to the original navigation route;
controlling the movement of the mobile robot after analyzing that the time during which the image acquisition device faces an overexposure region is longer than a preset time; and
adjusting a framing surface of the image acquisition device and navigating the mobile robot according to the images captured by the adjusted image acquisition device,
wherein, the step of adjusting a framing surface of the image acquisition device and navigating the mobile robot according to the images captured by the adjusted image acquisition device comprises any one of the following steps:
controlling the image acquisition device to deflect by an angle, and controlling the movement of the mobile robot according to the adjusted deflection angle and the original navigation route; and
controlling the image acquisition device to deflect by an angle, and modifying the original navigation route according to the adjusted deflection angle to control the movement of the mobile robot.

* * * * *